(12) United States Patent
Primadona et al.

(10) Patent No.: US 12,260,029 B2
(45) Date of Patent: Mar. 25, 2025

(54) UNIVERSAL HIGHLIGHTER FOR CONTEXTUAL NOTETAKING

(71) Applicant: Microsoft Technology Licensing, LLC, Redmond, WA (US)

(72) Inventors: Fnu Primadona, Mill Creek, WA (US); Sivaramakrishna Mopati, Issaquah, WA (US); Jason Glenn Silvis, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/950,488

(22) Filed: Sep. 22, 2022

(65) Prior Publication Data

US 2024/0103646 A1 Mar. 28, 2024

(51) Int. Cl.
*G06F 3/038* (2013.01)
*G06F 3/0354* (2013.01)
(Continued)

(52) U.S. Cl.
CPC .......... *G06F 3/03545* (2013.01); *G06F 3/038* (2013.01); *G06F 3/0482* (2013.01);
(Continued)

(58) Field of Classification Search
CPC .. G06V 30/1456; G06V 30/413; G06F 3/038; G06F 3/0482; G06F 3/03545; G06F 40/169; G06F 16/9558
See application file for complete search history.

(56) References Cited

U.S. PATENT DOCUMENTS

| | | |
|---|---|---|
| 5,523,775 A | 6/1996 | Capps |
| 6,820,237 B1 | 11/2004 | Abu-Hakima et al. |

(Continued)

FOREIGN PATENT DOCUMENTS

| | | |
|---|---|---|
| EP | 2824557 B1 | 1/2015 |
| EP | 2923285 A1 | 9/2015 |

OTHER PUBLICATIONS

Baralis, et al., "Highlighter: Automatic Highlighting of Electronic Learning Documents", In Journal of IEEE Transactions on Emerging Topics in Computing, vol. 6, Issue 1, Jan. 2018, pp. 7-19.

(Continued)

*Primary Examiner* — Yuzhen Shen

(57) ABSTRACT

Systems and methods are provided for interactively highlighting a region as pixel data on a screen and automatically retrieving context data associated with content of the highlighted region for contextual notetaking. The highlighted region includes at least a part of one or more windows and one or more applications associated with the one or more windows. The disclosed technology determines a context associated with content of the highlighted region and automatically retrieves context data that are contextually relevant to the content. Notes data are generated based on an aggregate of the highlighted content, window-specific context data, application-specific context data, and user-specific context data. A notetaking application retrieves the stored notes data from a notes database and displays the notes data for recall and for use. The contextual notetaking enables the user reducing a burden of performing manual operations for notetaking and utilizing notes that are enriched relevant data by context.

20 Claims, 11 Drawing Sheets

(51) Int. Cl.
  *G06F 3/0482* (2013.01)
  *G06V 30/14* (2022.01)
  *G06V 30/413* (2022.01)
(52) U.S. Cl.
  CPC ........ *G06V 30/1456* (2022.01); *G06V 30/413* (2022.01); *G06V 2201/02* (2022.01)

(56) References Cited

U.S. PATENT DOCUMENTS

| | | | | |
|---|---|---|---|---|
| 9,773,474 | B1* | 9/2017 | Gupta | G09G 5/02 |
| 9,870,633 | B2 | 1/2018 | Kraft et al. | |
| 10,552,539 | B2 | 2/2020 | Bachmann et al. | |
| 11,256,855 | B2 | 2/2022 | Reichmann | |
| 11,321,515 | B2 | 5/2022 | Pinnamaneni et al. | |
| 2005/0223315 | A1* | 10/2005 | Shimizu | G06F 40/169 |
| | | | | 715/230 |
| 2007/0177183 | A1* | 8/2007 | Robinson | G06F 40/279 |
| | | | | 358/1.14 |
| 2011/0202825 | A1* | 8/2011 | Volsky | G06F 40/169 |
| | | | | 715/230 |
| 2012/0111936 | A1* | 5/2012 | Brown | G06F 16/9554 |
| | | | | 235/375 |
| 2014/0019562 | A1* | 1/2014 | Le Chevalier | G06F 40/106 |
| | | | | 715/230 |
| 2014/0047308 | A1* | 2/2014 | Chub | G06F 40/171 |
| | | | | 715/201 |
| 2015/0009157 | A1* | 1/2015 | Chung | G06F 9/543 |
| | | | | 345/173 |
| 2015/0169067 | A1 | 6/2015 | Hong et al. | |
| 2018/0101509 | A1 | 4/2018 | Hicks | |
| 2019/0220507 | A1* | 7/2019 | Foss | G06F 40/171 |
| 2022/0206673 | A1* | 6/2022 | Zhan | G11B 27/031 |
| 2022/0350418 | A1* | 11/2022 | Gao | G06V 40/13 |

OTHER PUBLICATIONS

Anonymous: "How to OCR screenshot on Windows—Easy Screen OCR," Mar. 16, 2018 (Mar. 16, 2018), XP055649958, Retrieved from the Internet: URL: https://easyscreenocr.com/how-to-ocr-screenshot-on-windows/ [retrieved on Dec. 5, 2019], 3 pages.
International Search Report and Written Opinion received for PCT Application No. PCT/US2023/031107, Dec. 15, 2023, 17 pages.

* cited by examiner

UNIVERSAL HIGHLIGHTER FOR CONTEXTUAL NOTETAKING

BACKGROUND

Digital notetaking may involve capturing (e.g., copying) displayed information on a screen and pasting or otherwise saving the information to a digital note. Traditional techniques for notetaking include, for example, taking screenshots, typing or pasting text content, inserting images, and the like, into a note of a notetaking application or other application, such as a word processing application, calendaring application, presentation application, media application, and the like. Often, the note-taking operations for capturing and pasting data into notes are application dependent.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a system for receiving an indication of selected content (e.g., highlighting) on a display screen. The display screen may display multiple open windows, including but not limited to various applications, images, browser windows, and the like. Upon receiving indication of selected content (e.g., highlighting) on the display screen, rather than just capturing the selected content as a screenshot or "image" of the display, the system automatically detects underlying context data associated with highlighted content. The context data may include but is not limited to user context and display context. Display context may include underlying information related to the highlighted content, such as an application hosting the highlighted content, a URL associated with a browser presenting the highlighted content, metadata associated with the highlighted content (e.g., title, author, document type, meeting name, meeting attendees, etc.), and the like. In some cases, a user may select content on the display that spans multiple windows. In this case, display context may include information regarding multiple applications or browsers hosting the highlighted content, overlying or underlying window information, and the like. The context data may further include user context, including but not limited to usage history (e.g., a browsing history) or current context (e.g., other open applications, documents, browsers, etc.). In aspects, the disclosed technology may automatically capture and store the highlighted content with the context data as a digital note.

The phrase "highlighted content" refers to selected content that is emphasized in some way (e.g., by color, outline, annotation, etc.). "Context data" or "contextual data" refers to information that is contextually relevant to the highlighted content. For example, as noted above, contextual data may include display context (e.g., a title and other attributes associated with a window or windows that include the highlighted content), user context (e.g., information that is inferable based on a user profile, current or historical browsing, etc.). The phrase "notetaking" refers to capturing, generating, receiving and/or storing information related to an object or topic for later recall. The phrase "notes data" refers to captured data and determined data stored as notes. The notes data includes a combination of content data and context data. Content data include pixel data corresponding to the highlighted content. Context data includes display context data indicting context associated with displayed content and user context data indicating context associated with the user.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

Figure 5A:
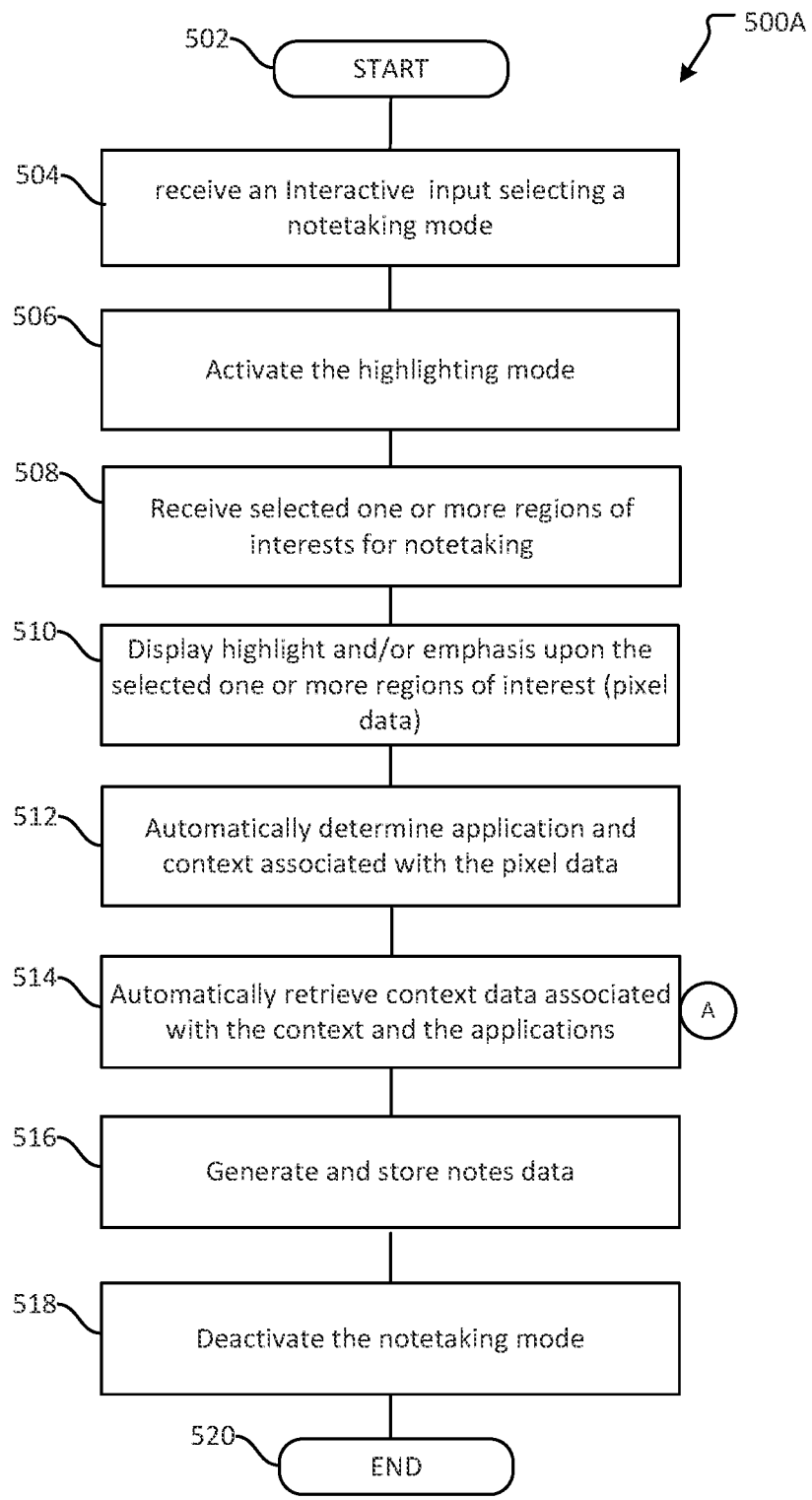
Figure 5B:
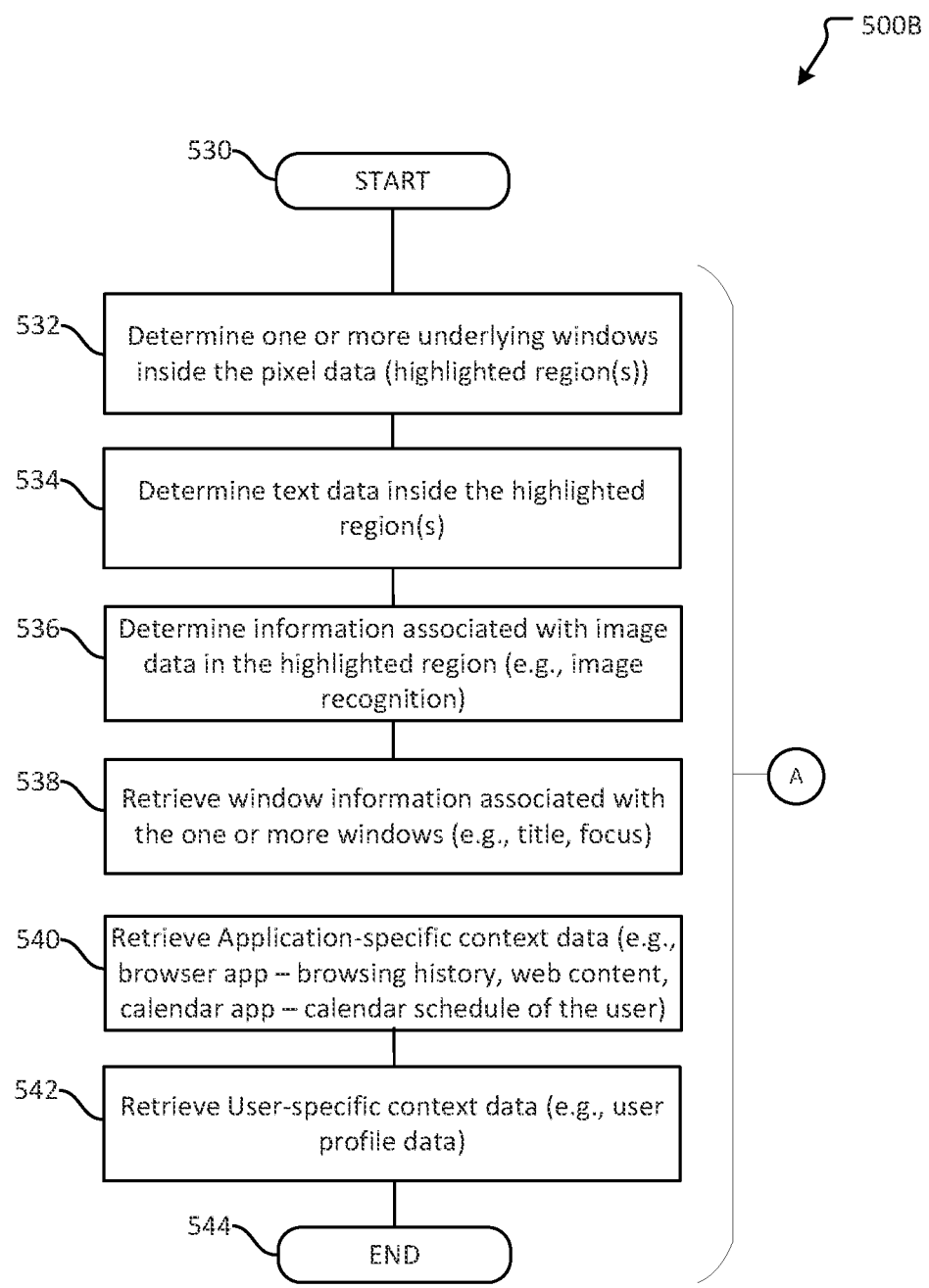

FIGS. 5A-B illustrate examples of methods for highlighting content and automatically capturing context data in accordance with aspects of the present disclosure.

Figure 6:
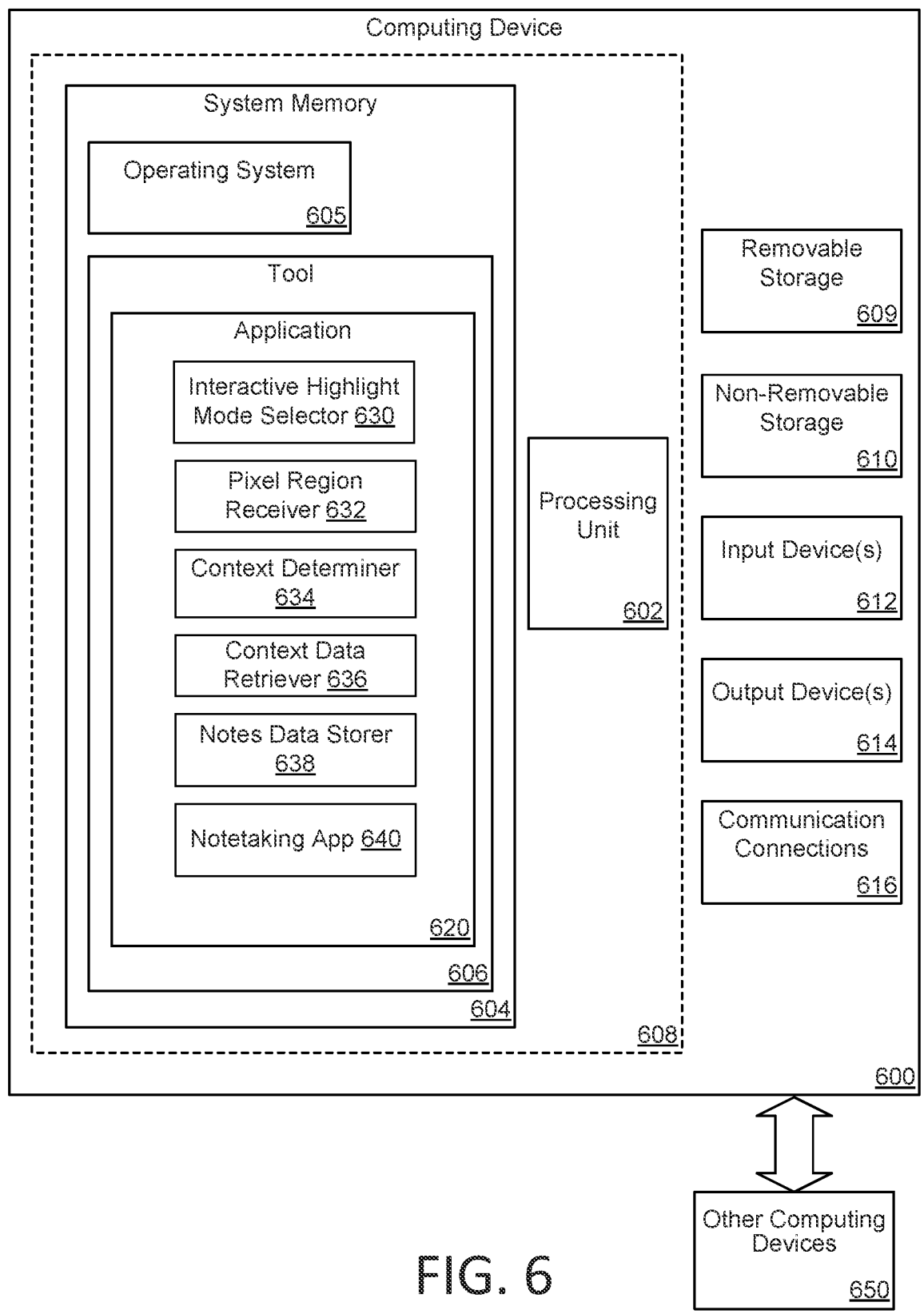

FIG. 6 illustrates an example of a method for automatically retrieving context data in accordance with aspects of the present disclosure.

Figure 7A:
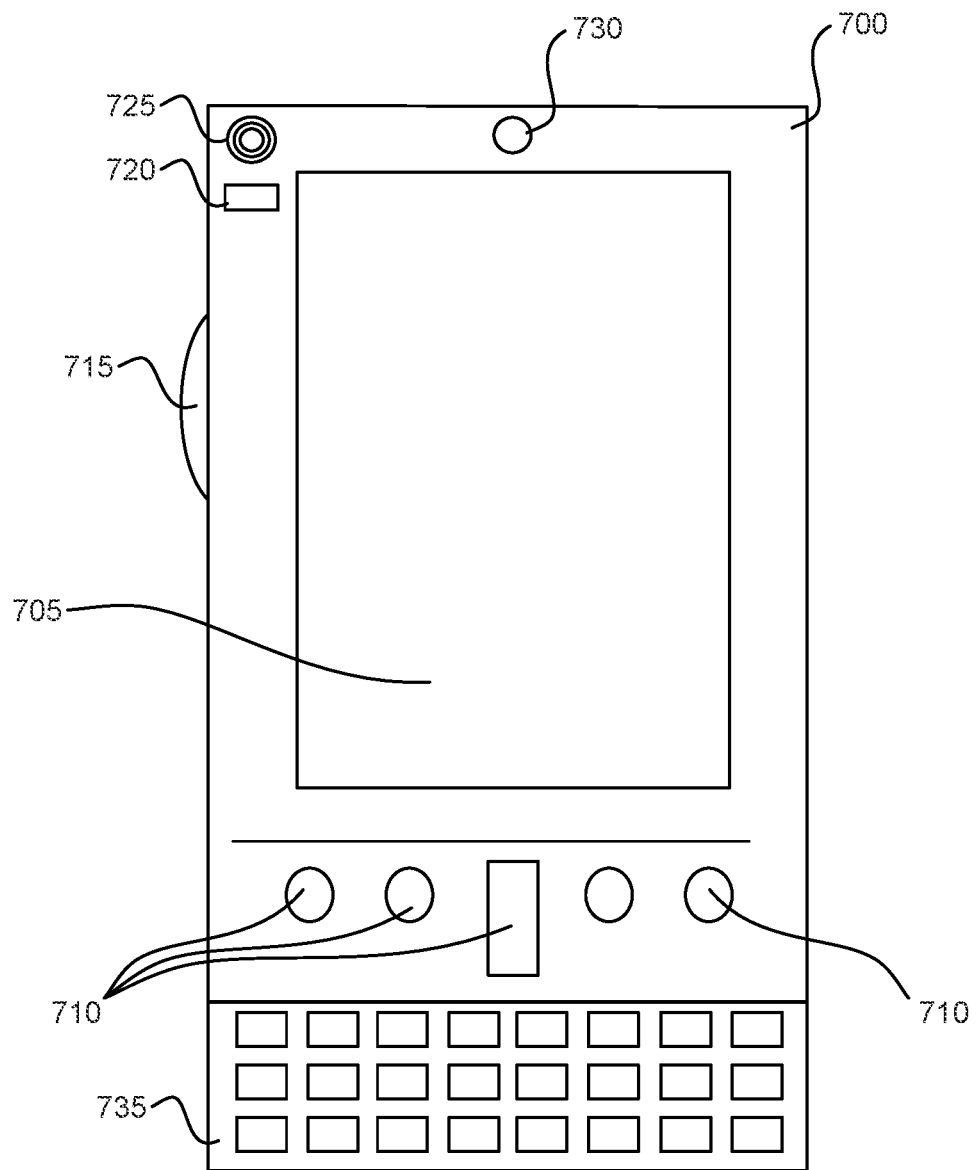

FIG. 7A is a simplified diagram of a mobile computing device with which aspects of the present disclosure may be practiced.

Figure 7B:
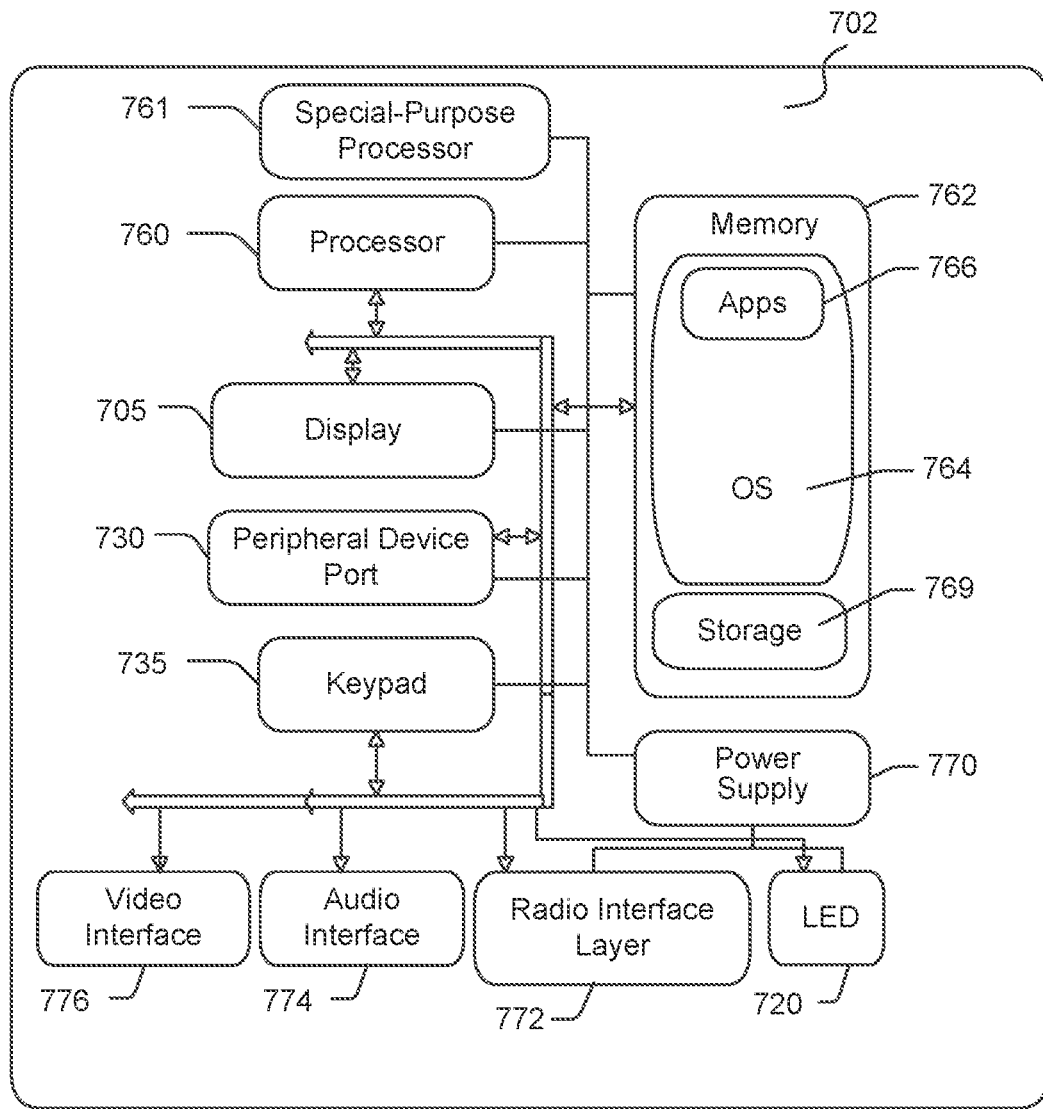

FIG. 7B is another simplified block diagram of a mobile computing device with which aspects of the present disclosure may be practiced.

DETAILED DESCRIPTION

Users often desire to take notes while reading and/or viewing content displayed on a screen. With the advent of "notetaking" applications, users are able to perform notetaking digitally. In examples, users may open a document hosted by a notebook application while viewing a video and/or slide presentation and may type information as the user views the video and/or the slide presentation. Traditionally, a user may capture frames of the video and/or the slide presentation by taking a screenshot image using a screenshot application. In other examples, a user may copy text or images (e.g., of a document) and paste the copied portions into a digital note.

Context is often important for enabling a user to recall or remember why a note was captured. Unlike physical notetaking, in which a note can be posted in a physical location to aid the user with recall, digital notetaking requires the user to manually input such context. For example, with physical notetaking, a note with merely a name and phone number can be posted on a thermostat to enable the user to readily remember to call an HVAC service person. Alternatively, the same name and phone number in a digital note would not enable such immediate recall. In this case, the user must manually enter context, e.g., an explicit text reminder to call for HVAC service, the name of the HVAC company, or some other relevant context. These are simplified examples, but the present application seeks to determine the context of a digital note without the need for manual user input or explanation. Not only does the present application describe automatically detecting underlying display context for highlighted content on a display screen, the present application describes detecting a user context associated with the highlighted content. For example, a user may highlight a portion of content associated with a browser session by initiating a highlight mode on the display screen and using a virtual pen to circle a portion of the content (e.g., an image of a car) and/or virtually highlight a portion of text (e.g., a make or model of the car, a price of the car, a year of the car, etc.). The system may automatically create a digital note with the highlighted content.

Further, display context for the highlighted content may be automatically included in the note, such as a URL for the underlying website or webpage being displayed, image recognition data (e.g., color, car type, etc.), metadata (e.g., timestamp, image title, author, etc.), and the like. Additionally, based on user profile information, browsing history, currently open applications or windows, calendar, etc., the present application may determine a user context with respect to the highlighted content. The user context may be indicative of "why" the user captured the highlighted content. For example, based on the user's recent browsing history associated with auto financing and vehicle sales websites, the system may determine that the user is interested in buying a car and may associate the note with a "car search." Thereafter, when the user highlights similar content with similar context, the system may recall the previous note for user reference and/or for updating the note with the similar content.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

As discussed in more detail below, the present disclosure relates to digital notetaking based on capturing highlighted content into a note and automatically determining and updating the note with context for the highlighted content. The present disclosure improves usability of the computing device by enabling the user to highlight content for contextual notetaking, and, without further user input, automatically determining a context associated with the highlighted content, retrieving context data associated with the highlighted content, and generating a digital note. The disclosed technology provides an interactive user interface that is application-independent for highlighting content on a display screen. Since the application is automatically capturing context in the background, the user does not need to manually input the context, which reduces interruptions and enables the user to focus on displayed content (e.g., watching a video and/or slide presentation, reading and/or writing a document, and the like).

The automatic retrieval of context data eliminates the need for the user to gather additional data associated with the highlighted content in generating notes data. Based on the determined context included in a note, the user is able to later recall not only the content but also the user's determined intent behind capturing the content in a note. Contextual notetaking reduces the burden on the user to perform manual operations, while enabling the user to quickly capture content into a note (e.g., utilizing a virtual highlighter), which is automatically enriched with relevant contextual data associated with the captured content. Accordingly, the present disclosure makes both the notetaking and note recall operations substantially efficient and effective for a user.

Figure 1:
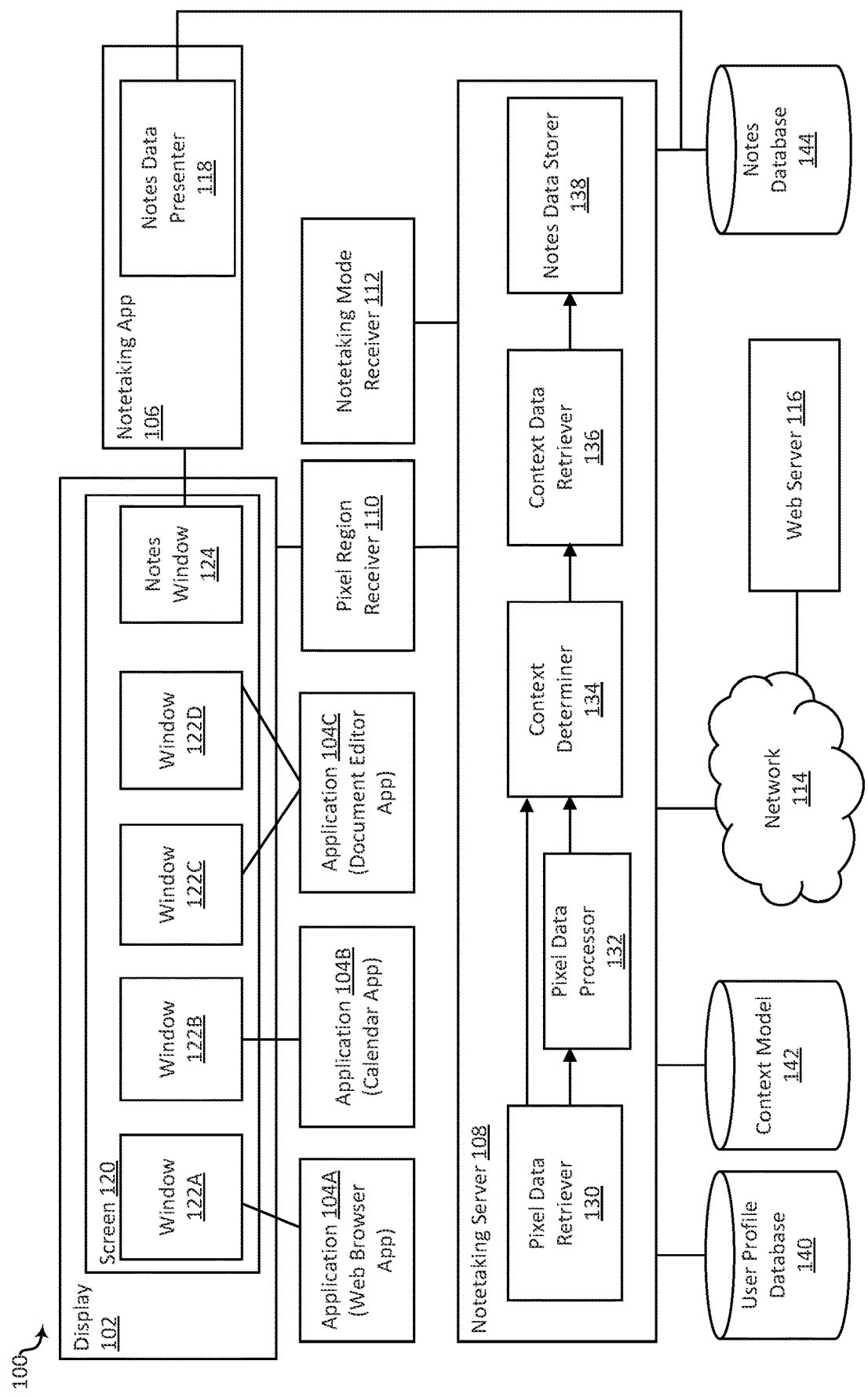
FIG. 1 illustrates an overview of an example system for automatically capturing content and context data associated the content for notetaking in accordance with aspects of the present disclosure.

FIG. 1 illustrates an overview of an example system for automatically capturing content and context data associated the content for notetaking in accordance with aspects of the present disclosure. A system 100 includes a display 102, applications 104A-104D, a notetaking app 106, a notetaking server 108, a pixel region receiver 110, a notetaking mode receiver 112, a network 114, and a web server 116. The display 102 includes a screen 120 and displays windows 122A-122D and notes window 124 on the screen 120. The applications 104A-104D includes application 104A (Web Brower App), application 104B (Calendar App), application 104C (Document Editor App). The application 104A interactively displays web browsing content in the window 122A. The application 104B interactively displays content associated with a calendar and scheduling meetings in the window 122B. The application 104C interactively displays one or more documents for editing in the window 122C and the window 122D. The notetaking app 106 interactively displays notes data in the notes window 124.

The notetaking app 106 interactively takes notes and includes notes data presenter 118. The notetaking app 106 interactively displays one or more notes data recorded by the user. The notes data presenter 118 retrieves notes data from a notes database 144 and displays at least a portion of the notes data or an icon that is representative of the notes data in the notes window 124 on the screen 120 of the display 102.

The notetaking server 108 includes pixel data retriever 130, pixel data processor 132, context determiner 134, context data retriever 136, and notes data storer 138. The notetaking server 108 connects to user profile 140, context model 142, and notes database 144. The notetaking server 108 further connect to the web server 116 via the network 114.

The pixel region receiver 110 interactively receives one or more pixel regions in the screen 120 of the display 102 as the user uses a handheld input device (e.g., a pen, a mouse, and the like). The pixel region receiver 110 receives positional data that specifies the one or more regions for highlighting content. In examples, the pixel region receiver 110 highlights the selected one or more regions by overlaying colors upon the content and/or changing colors used for displaying content (e.g., foreground and background colors) within the one or more regions.

The notetaking mode receiver 112 receives a selection of an input mode for interactively receiving the one or more regions of content on the screen 120 of the display 102 for highlighting. Once highlighted, the disclosed technology automatically creates a note including the highlighted content, as specified by the one or more highlighted regions, and context data associated with the content. In examples, the notetaking mode receiver 112 further displays one or more icons for selection by the user to initiate or terminate the universal notetaking mode. In aspects, the universal notetaking corresponds to universal highlighting. Universal highlighting enables a user to highlight content across the windows 122A-122D, as rendered on the screen 120 of the display 102. As such, the universal highlighting is agnostic to both a window focus and respective applications that display content in the respective windows.

In examples, the pixel data retriever 130 of the notetaking server 108 retrieves pixel data corresponding to one or more regions selected by the user for highlighting. The pixel data includes a copy of raster image data in pixels corresponding to a selected region. The pixel data may further include information indicating a position and a size of the pixel data on the screen 120 of the display 102.

The pixel data processor 132 processes the pixel data using one or more types of processors including an image recognition processor, a character recognition processor, and the like, and identifies content of the pixel data. The pixel data processor 132 identifies one or more objects rendered in the pixel data. For example, the pixel data processor 132 recognize a particular model of a car that is rendered in the pixel data by recognizing shapes and features (e.g., locations of various parts of the car). When the one or more regions include a region where a video data is displayed, the pixel data may include a frame of the video data at the time of selection. Additionally, or alternatively, the pixel data may include more than one frame of the video data as a video snippet for a predetermined time duration (e.g., one second). Additionally, or alternatively, the pixel data processor 132 identifies information associated with at least a part of one or more windows appearing in the pixel data. In aspects, the pixel data processor 132 determines an identifier the one or more windows.

The context determiner 134 determines context data. The context data includes at least one of display context or user context. The display context includes information associated with one or more applications associated with the at least a part of one or more windows in the pixel data. For example, selected and highlighted pixel regions may include a part of the window 122A that corresponds to the application 104A which is a web browser app. Based on the information associated with the one or more windows identified by the pixel data processor 132, the context determiner 134 further determines various display context associated with the content, including but not limited to a window title, a Universal Record Locator (URL) of a website, a document name, a meeting name, meeting attendees, caption data of a video played by a video player, and the like. In further aspects, the context determiner 134 may receive display context regarding the one or more windows from an operating system of the computing device.

Additionally, or alternatively, the context determiner 134 determines user context for inclusion in notes data. In aspects, the context determiner 134 determines the user context based on various information including but not limited to usage history by the user (e.g., a browsing history and/or a history of accessing information) or types of applications, browsers, documents, etc., currently open in the display 102. Accordingly, the context determiner 134 determines an extent to which the context data retriever 136 accesses various databases and external websites and other servers to retrieve context data associated with the highlighted pixel regions. For example, the context determiner 134 determines a set of web pages for retrieving content as user context and specifies a range of time for retrieving historical data as user context associated with the highlighted data for notetaking. In aspects, a maximum number of web pages and the range of time for retrieving browsing history may be predetermined.

Additionally, or alternatively, the context determiner 134 uses the context model 142 to determine a context associated with the pixel data. In aspects, the context model is a machine learning model trained to predict context from a given set of pixel data and information associated with the pixel data. The machine learning model in examples may include artificial intelligence models for computer vision to detect screen and objects. The machine learning model may include natural language processing models for selecting and organizing topics to infer a context. The context model may be a local model stored in a computing device and/or in a server. Additionally, or alternatively, the context model may be a cloud model stored in a cloud. The context model includes user models that are personalized for respective users.

The context data retriever 136 retrieves the context data and aggregates the context data with highlighted data to generate notes data. Notes data include one or more types of data objects (e.g., text data, image data, video data, audio data, and the like) that are associated with (or related to) each other. In aspects, the context data retriever 136 retrieves information associated with an object identified in the highlighted data. For example, the context data retriever 136 retrieves information associated with a particular car as recognized in the pixel data by searching for the information on the web server 116 across the network 114 (e.g., the Internet).

The notes data storer 138 stores the notes data in the notes database 144. In aspects, the notes database 144 may be indexed by a time of operations, the user, a context, and the like. As detailed above, the notes data presenter 118 of the notetaking app 106 accesses the notes database 144 and retrieves notes objects for displaying to the user in the notes window 124.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2A:
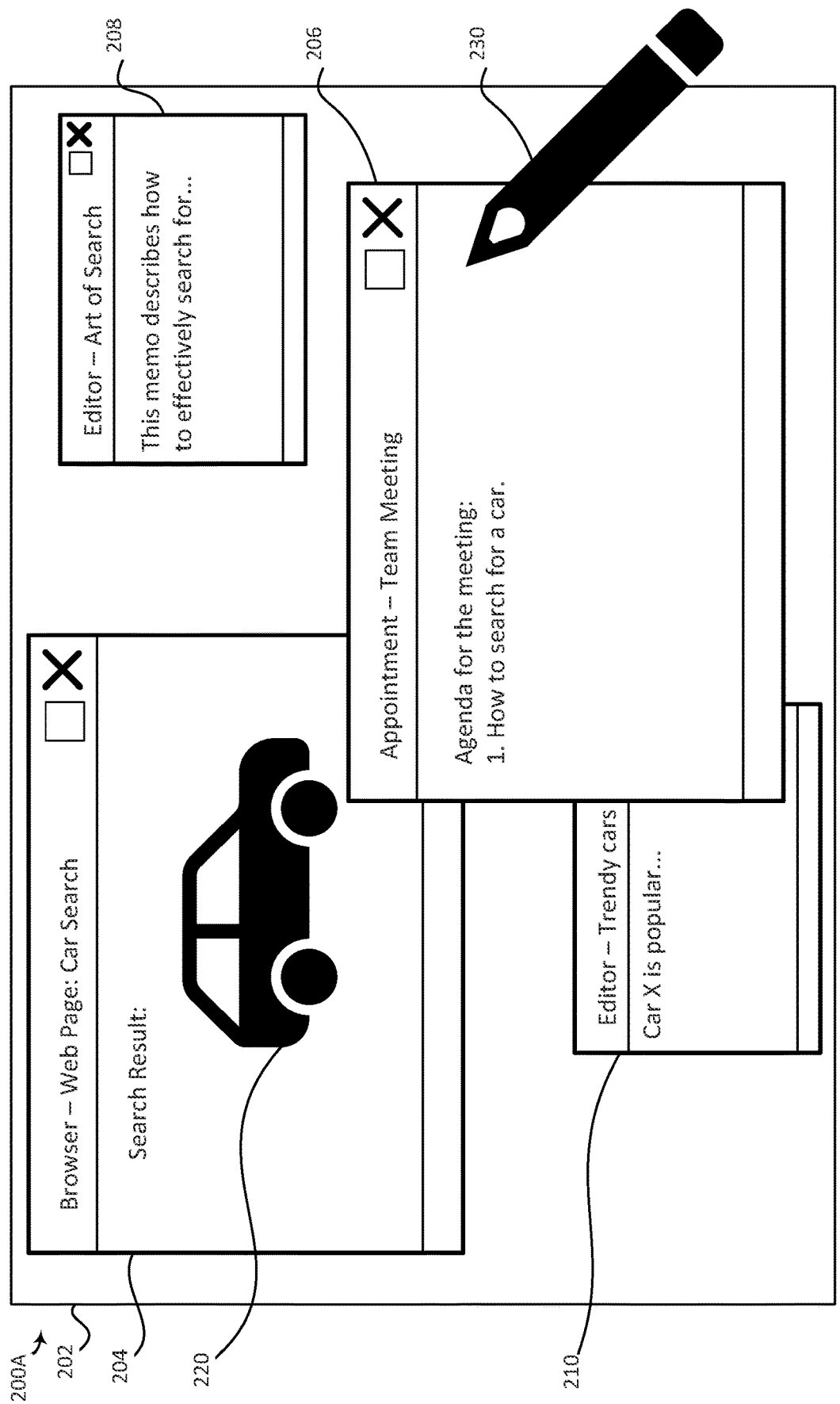
FIGS. 2A-2C illustrate example graphical user interfaces in accordance with aspects of the present disclosure.
Figure 2B:
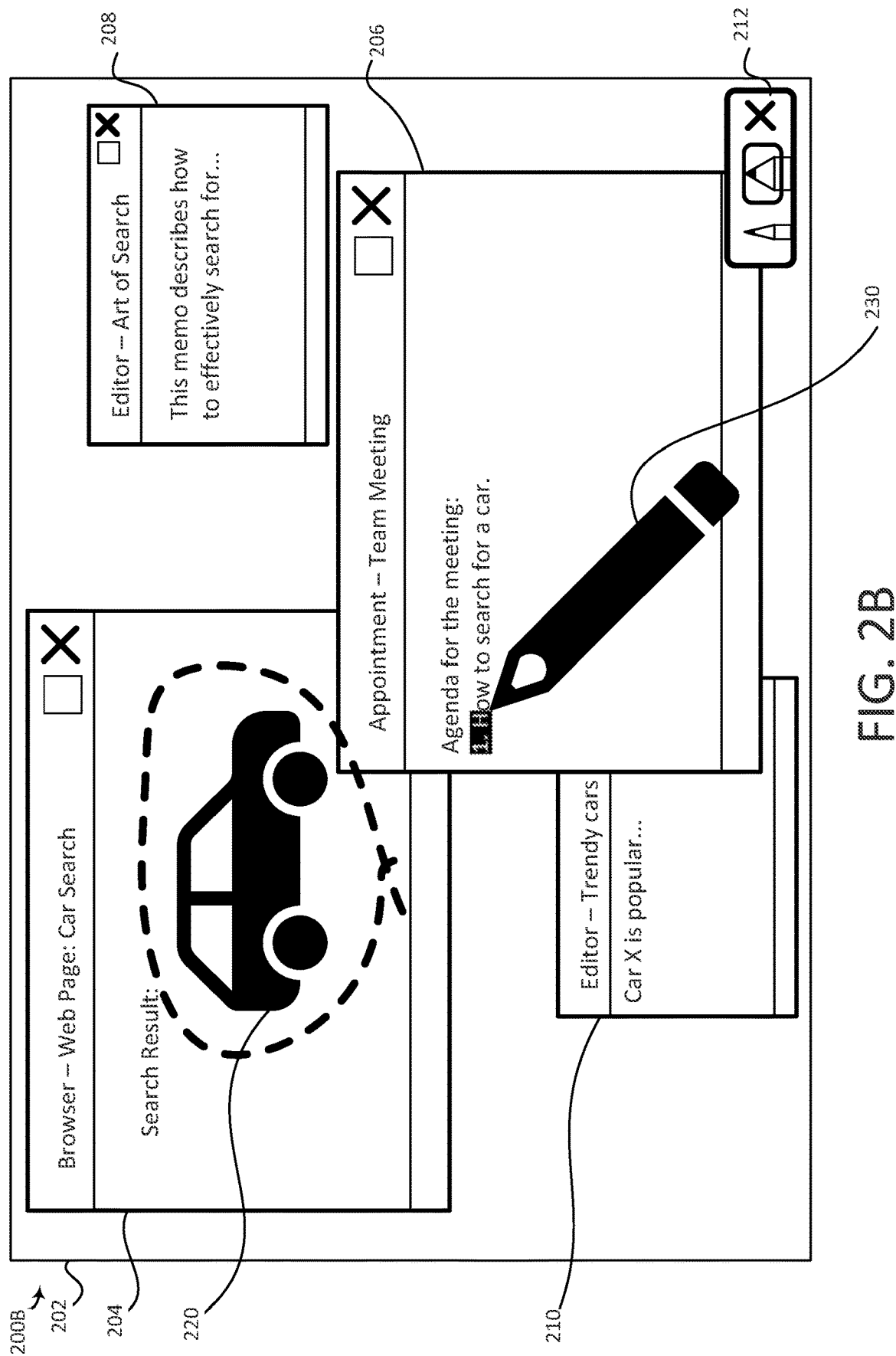
Figure 2C:
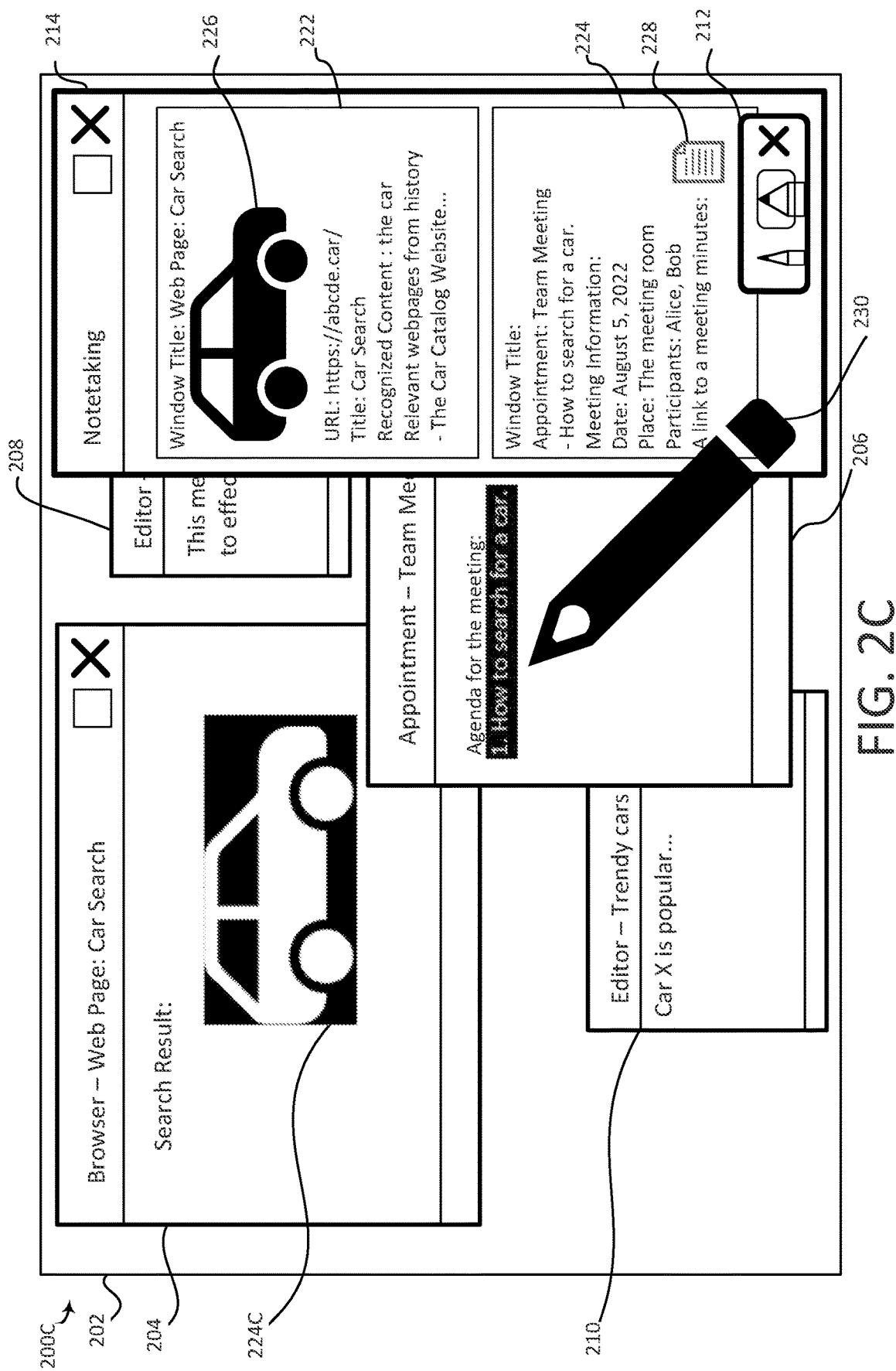

FIGS. 2A-2C illustrate example graphical user interfaces in accordance with aspects of the present disclosure. In particular, the figures sequentially illustrate a user selecting and highlighting some of content displayed in windows of a screen for notetaking. In FIG. 2A, a system 200A includes a screen 202 and a pen 230. The screen 202 includes browser window 204, appointment window 206, editor window 208, and editor window 210. The user interactively interacts with content displayed in the screen 202 using the pen 230. The respective windows may display icons for operating on the respective windows, including displaying a window on full-screen and closing the window, for example.

The browser window 204 displays a result of a web search. In examples, the browser window 204 indicates a window title "Browser—Web Page: Car Search" and content "Search Result:" and an image of a car 220 as a search result. The browser window 204 is associated with a web browser application (e.g., the application 104A (Web Browser App) as shown in FIG. 1).

The appointment window 206 displays information associated with an appointment. The appointment window 206 displays "Appointment—Team Meeting" as its window title and "Agenda for the meeting: How to search for a car" as its content. The appointment window 206 is associated with the application 104B (Calendar App) as shown in FIG. 1).

The editor window 208 displays a document being edited by the user. The editor window 208 indicates "Editor—Art of Search" as its title and "This memo describes how to effectively search for . . . " in text as content. The editor window 210 displays another document being edited by the user. The editor window 210 indicates "Editor—Document B" as its title and "This memo describes how to quickly buy . . . " in text as its content. The editor window 208 and the editor window 210 are associated with a document editing application (e.g., the Application 104C (Document Editor App) as shown in FIG. 1).

The pen 230 is an example of a handheld input device. The pen 230 enables the user to interactively input data (e.g., image illustrations, characters for texts, and the like) and gestures to operate (e.g., selecting and highlighting) upon windows and contents displayed in the screen 202.

FIG. 2B illustrates an example of a part of content being interactively highlighted. In FIG. 2B, a system 200B includes the screen 202 and the pen 230. The screen 202 includes the browser window 204, the appointment window 206, the editor window 208, and the editor window 210. The screen 202 further includes a highlighter control panel 212.

In examples, the user selecting a predetermined input causes the system 200B to initiate a notetaking mode (e.g., a universal highlighting mode). An example of the predetermined input includes receiving a press input event on the back end of the pen 230. In response to the initiating the notetaking mode, the system 200B displays the highlighter control panel 212. The highlighter control panel 212 includes a set of icons for selecting a type of highlighting to be used for highlighting selected content displayed on the screen 202. An example of a type of highlighting includes a color, a shape, a thickness of the highlights, and the like.

The appointment window 206 includes a portion of content being highlighted. In particular, characters "1. Ho," of the text "1. How to search for a car," are highlighted by inverted colors. In aspects, the user may use the pen 230 to touch along the text to highlight the text for notetaking. In some aspects, the highlighting with the pen 230 may be associated with a color that corresponds to a category of notes. For example, a color red may represent a high level of importance of notes. A color yellow may represent the highlighted portion indicating a to-do item. In examples, the captured notes maintain the same color as the highlighted color in the notes data.

The system 200B receives one or more selections of content from one or more windows displayed on the screen 202 highlighting during the notetaking mode. User operations during the notetaking mode is independent from application-specific operations for selecting and highlighting content.

In FIG. 2C, the system 200C includes the screen 202 and the pen 230. The screen 202 includes the browser window 204, the appointment window 206, the editor window 208 (partially shown), the editor window 210, and the highlighter control panel 212. The browser window 204 includes the image of the car 224C in inverted colors, indicating the content as highlighted. The appointment window 206 includes a line of text "-How to search for a car." In inverted colors, indicating the content as highlighted.

The screen 202 further includes a notetaking window 214. The notetaking window 214 displays a list of notes (e.g., a first note 222 and a second note 224) that have been taken and stored for recall by the user. An order of notes on the list may be based on a time sequence of receiving the highlighting input or its reverse chronological order. The order of notes may be based on recency of notes being interactively selected by the user. The respective notes include highlighted content for notetaking and context data associated with the respective highlighted content. The context data includes display context and user context. For example, the first note 222 includes an image of the car 226 that corresponds to the highlighted image of the car 224C. The first note 222 further includes information according to display context associated with the image of the car 226 and the browser window 204. The context data associated with the browser window 204 include a window title, "Web Page: Car Search," URL abcde.car/and title of the website, "Car Search." In aspects, the disclosed technology includes an image recognition function and recognizes highlighted content when the content includes image data. The first note 222 further includes "the car" as a feature of the image of the car 226 as recognized by the system 200C. Additionally, or alternatively, the disclosed technology may recognize content that is other than image data (e.g., audio, video, and the like). The first note 222 further includes, based on a user context, relevant webpages from a browsing history: a link to a website "the Car Catalog Website." In examples, the first note 222 includes a result of retrieving context data that are relevant to the highlighted content according to a user profile of the user. The user profile may include the browsing history and other usage logs associated with the user.

The second note 224 includes a note that has been captured based on the highlighted text "1. How to search for a car" in the appointment window 206. The second note 224 includes, as a display context, a window title "Appointment: Team Meeting" and the highlighted text "1. How to search for a car." The second note 224 further includes, as a user context, meeting data associated with the appointment of the highlighted text. The second note 224 includes "Meeting information: Date: Aug. 5, 2022; Place: The meeting room; Participants: Alice, Bob; and a link to meeting minutes." The link to meeting minutes may be indicated by an icon of a file. In aspects, the system 200C retrieves and saves content of the file when the user selects the icon.

Figure 3:
FIG. 3 illustrates an example data structure associated with highlighted data in accordance with aspects of the present disclosure.

FIG. 3 illustrates an example data structure associated with highlighted data in accordance with aspects of the present disclosure. The table 300 includes a list of highlighted data 302. The table 300 includes an index 304 to a highlighted data, window 306 indicating an identifier of a window in which the highlighted data is located, window title 310 indicating a title of a window, and content 312 that correspond to the highlighted data.

In an example, highlighted data with an index 304 of "1," in window 306 identified as "1", with data type 308 as raster image data. The window title 310 of the highlighted data with the index 304 of 1 is "How to buy a car" and content 312 is a car as recognized by the system. Similarly, highlighted data with an index 304 of "2," in window 306 identified as "2," and having a window title 310 of "Appointment," is a calendar event with text content, "1. How to search for a car.".

In aspects, each row of the table 300 with the highlighted data 302 corresponds to content that has been selected and highlighted. The table 300 may include additional attributes in columns, including but not limited to an application associated with the highlighted data, an operational sequence of highlighting the data, and one or more links to application-specific data (e.g., appointment information) and the user-specific data (e.g., a browsing history).

Figure 4:
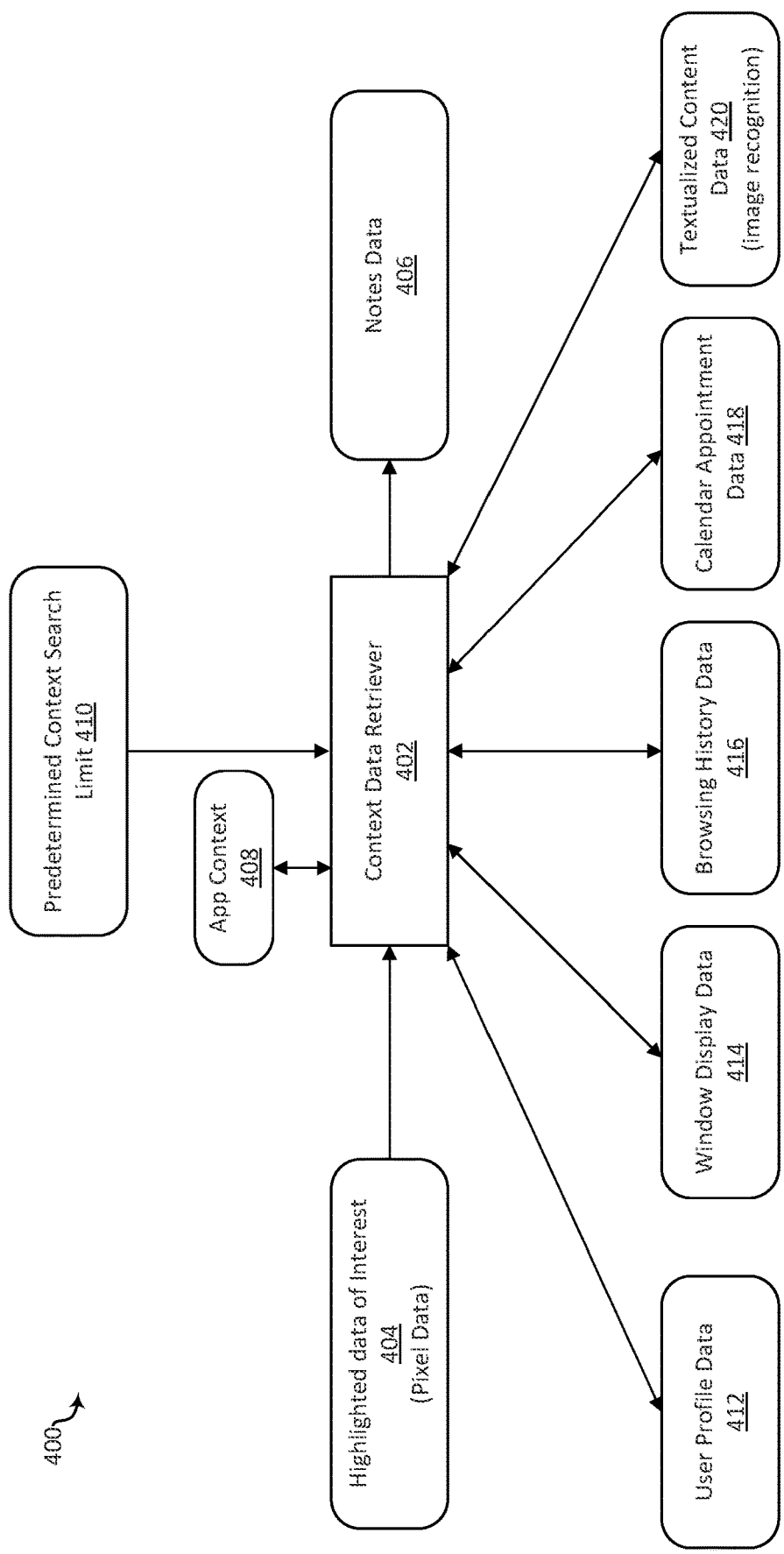
FIG. 4 illustrates an example system for automatically retrieving context data associated with content in accordance with aspects of the present disclosure.

FIG. 4 illustrates an example system for automatically retrieving context data associated with content in accordance with aspects of the present disclosure. A system 400 includes a context data retriever 402 (e.g., the context data retriever 136 as shown in FIG. 1). The context data retriever 402 retrieves context data from various sources based on highlighted data of interest 404 (e.g., pixel data) as selected by the user on the screen (e.g., the screen 202 as shown in FIGS. 2A-2C) and generates notes data 406.

The context data retriever 402 receives a combination of the highlighted data of interest 404, an application-specific context 408, and a predetermined context search limit 410. For example, the highlighted data of interest 404 may include an image of a car displayed in a web browsing window (e.g., the image of a car 220 displayed in the browser window 204 as shown in FIG. 2B). The application-specific context 408 includes methods to access context data that are application-specific (e.g., accessing calendar appointment data that is specific to a calendar scheduling application, web browsing data that is specific to a web browsing application, and the like).

The predetermined context search limit 410 specifies an extent to search for context data. An example of the predetermined context search limit includes a maximum number of entries to be captured from a web browsing history, which are relevant to the highlighted content on a web page. The predetermined context search limit 410 may further include a list of attributes associated with a window from which content is highlighted. The list of attributes may include, for example, a title, an application associated with the window, and the like.

Sources of context data may include user profile data 412, window display data 414, browsing history data 416, calendar appointment data 418, and textualized content 420 (e.g., image recognition). The context data retriever 402 queries and retrieves a combination of display context and user context as context data from the respective sources according to the predetermined context search limit 410.

The user profile data 412 may include a name and other information associated with the user and credentials for accessing data. The window display data 414 include a title of a window, a layout and size of the window, a time duration of displaying the window, and the like.

The browsing history data 416 may include web page information of a set of web pages that the user has visited. An example of the web page information includes an URL of a web page, a date and a time of visiting the web page, a title of the web page, and the like.

The calendar appointment data 418 may include information associated with appointments (e.g., meetings and activities) that are relevant to the user. An example of the calendar appointment data 418 include a title, a date, a time, a location, participant(s), agenda, and minutes of a meeting appointment.

The textualized content data 420 (e.g., image recognition data) indicates textualized data of the highlighted content. When the highlighted content includes a data type that is non-text (e.g., image data, video data, audio data, and the like), the present disclosure processes the highlighted content and generates textualized data. For example, when the highlighted content includes image data, the disclosed technology recognizes the image data and generates text data that represent the image data. When the highlighted content includes an image of a car (e.g., the image of a car 220 as shown in FIG. 2A), the textual data is "the car" based on an image recognition. The image recognition may identify a feature of the image data in text. For example, the textual data may further include "the car as a pictograph" or "the car model X manufactured by Y in year 2022."

FIGS. 5A-B illustrate examples of methods for highlighting content and automatically capturing context data in accordance with aspects of the present disclosure. A general order of the operations for the method 500A for highlighting content and automatically capturing context data is shown in FIG. 5A. Generally, the method 500A begins with start operation 502. The method 500A may include more or fewer steps or may arrange the order of the steps differently than those shown in FIG. 5A. The method 500A can be executed as a set of computer-executable instructions executed by a computer system and encoded or stored on a computer readable medium. Further, the method 500A can be performed by gates or circuits associated with a processor, an ASIC, an FPGA, a SOC or other hardware device. Hereinafter, the method 500A shall be explained with reference to the systems, components, devices, modules, software, data structures, data characteristic representations, signaling diagrams, methods, etc., described in conjunction with FIGS. 1, 2A-C, 3, 4, 5B, 6, and 7A-B.

Following start operation 502, the method 500A begins with receive operation 504, in which an interactive input selecting a notetaking mode is received. An example of receiving the interactive input include receiving an event that corresponds to the user pressing a button on a pen or a handheld input device. Other examples include a selection of an icon (e.g., of a highlighter pen) displayed on the screen.

At activate operation 506, the notetaking mode is activated in response to the received interactive input selecting the notetaking mode. While the notetaking mode is active, the disclosed technology recognizes a selection of one or more regions on the screen for notetaking. A highlighter control panel (e.g., the highlighter control panel 212 as shown in FIG. 2) is displayed to indicate the notetaking mode and to enable the user to select a type of highlighter for selecting content displayed on the screen.

At receive operation 508, one or more regions of interest (e.g., as pixel data) are received in response to the user selection for notetaking. In examples, the receive operation 508 receives the one or more regions of interests across a plurality of windows associated with a plurality of distinct applications. For example, the receive operation 508 receives pixel data regions including a part of web browsing window associated with a web browser application and a part of appointment scheduling window associated with an appointment scheduling application. In aspects, highlighted content is not necessarily confined to one window or one underlying application.

At display operation 510, the selected one or more regions of interest may be displayed as highlighted. The selected regions of interest may be highlighted in a variety of ways including displaying the one or more regions in inverted colors.

At determine operation 512, information associated with one or more applications associated with the pixel data are automatically determined. In examples, the information associated with one or more application includes attribute values associated with a window to which the pixel data correspond. Examples of the attribute values associated with a window include a window title, an application associated with the window, a document title associated with the application, and the like. Determining the context associated with the pixel data includes evaluation of one or more applications open or visited by the user. For example, when the pixel data (e.g., the highlighted region) includes image data that is a result of a search using a web application, the determine operation 512 determines a web search as user context.

At retrieve operation 514, context data that is related to the pixel data is retrieved. The context data of the pixel data includes textual data associated with one or more objects rendered in the pixel data. In examples, an image recognition process may be used to determine the textual data associated with image data recognized from the pixel data. The image recognition process may be distinct from an underlying application associated with the window. For example, the image recognition process determines that highlighted image data is a car, such information may be identified as display context. Further, based on determining that the image was a result of a search on an auto sales web site, the retrieve operation 514 may determine a user context of the highlighted content to be the user searching for a car.

Additionally, or alternatively, the context data may include information associated with web pages that are substantially relevant to content of the pixel data by searching through information associated with web pages in a browsing history by the user. The retrieve operation 514 further includes generating notes data by aggregating the highlighted pixel data with retrieved context data associated with the highlighted pixel data. The retrieve operation 514 further includes operations as detailed in FIG. 5B, as designated by a label 'A.'

At generate and store operation 516, notes data is generated and stored in a notes database (e.g., the notes database 144 as shown in FIG. 1). In aspects, the generate and store operation 516 generates the notes data based on a combination of content of the highlighted region, the determined user context, and the retrieved context data that are substantially related to the display context of the highlighted content. The generate and store operation 516 further causes a notetaking application (e.g., the notetaking app 106 as shown in FIG. 1) to retrieve the notes data from the notes database and display notes data.

At deactivate operation 518, the notetaking mode is deactivated. In examples, the notetaking mode may be deactivated by pressing one end of the pen. Responsive to deactivating the notetaking mode, the highlighter control panel may be removed from the screen. The method 500A ends with the end operation 520.

As should be appreciated, operations 502-520 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 5B illustrates an example of a method for automatically retrieving context data associated with the pixel data associated with the highlighted regions of interest. A general order of the operations for the method 500B is shown in FIG. 5B. Generally, the method 500B begins with start operation 530. The method 500B may include more or fewer steps or may arrange the order of the steps differently than those shown in FIG. 5B. The method 500B can be executed as a set of computer-executable instructions executed by a computer system and encoded or stored on a computer readable medium. Further, the method 500B can be performed by gates or circuits associated with a processor, an ASIC, an FPGA, a SOC or other hardware device. Hereinafter, the method 500B shall be explained with reference to the systems, components, devices, modules, software, data structures, data characteristic representations, signaling diagrams, methods, etc., described in conjunction with FIGS. 1, 2A-C, 3, 4, 5A, 6, and 7A-B.

The method 500B corresponds to the retrieve operation 514 as shown in FIG. 5A, as indicated by a label 'A.' Following start operation 530, the method 500B begins with determine operation 532, in which one or more underlying windows inside the highlighted regions are determined. The highlighted regions may encompass more than one windows, each window associated with distinct applications. In examples a part of the highlighted regions covers a window that is associated with a web browser application. Another part of the highlighted regions covers another window that is associated with a calendar application. In examples, the highlighted regions are expressed as pixel data.

The determine operation 532 analyzes the pixel data associated with the highlighted regions and identifies coordinates on the screen. The determine operation 532 further queries, based on the identified coordinates, the operating system for information associated with the one or more underlying windows in the highlighted regions. For example, the determine operation 532 invokes an application programming interface (API) to query identifiers of the one or more underlying windows based on coordinate information as input. The API may be provided by an operating system that implements windows on the screen and inputs from devices (e.g., handheld input devices). In some aspects, the analyzing the pixel data includes detecting one or more edges of a window for help expediting determining the one or more underlying windows inside the highlighted regions.

At determine text data operation 534, text data displayed inside the highlighted regions may be determined using character recognition processing or through an underlying application associated with the window in which at least a part of the highlighted regions are located.

At determine information operation 536, textual information that represents the pixel data is determined using an image recognition process. The image recognition may use a neural network to predict an object appearing in the pixel data. For example, when the pixel data includes an illustration or a photo of a car, the determine information operation 536 may determines text data that describes a make and a model of the car that substantially matches with the object in the pixel data.

At retrieve window information operation 538, information associated with one or more windows associated with the highlighted regions is retrieved. In aspects, the operating system maintains positional information associated with windows displayed on the screen. Accordingly, the retrieve window information operation 538 obtains information associated with the one or more underlying windows associated with the highlighted regions based on identifiers of windows. The retrieve window information operation 538 further obtains various information associated with the windows as context data. Examples of the information associated with the windows include titles of window, an application associated with the window, whether the window is a focused window for receiving user input, and the like. In aspects, information associated with the window in the highlighted region is a part of display context.

At retrieve application-specific context data operation 540, context data that depends on one or more applications may be retrieved as either display context or user context. For example, when an underlying application associated with a window is a web browser app, the web browser app may be retrieved as display context. The retrieve application-specific context data operation 540 also queries and retrieves a browsing history of the user, which may be retrieved as user context. In aspects, the retrieve application-specific context data operation 540 may further filter web pages visited by the user that include words that are substantially similar to content of the highlighted regions as user context. In addition to a browsing history, the retrieve application-specific context data operation 540 may retrieve context data associated with applications that are associated with the highlighted regions. For example, when a calendar application is associated with a window that is open on the display screen, content of the window may be evaluated as user context. If the content includes a meeting appointment entitled, "Meet Fred at dealership," this information may provide further user context suggesting the user is searching for a car. In aspects, user context includes context that is inferable from the user's action of highlighting the region as user's characteristic and/or actions.

At retrieve user-specific context data operation 542, information associated with the user and user operations is retrieved. For example, the user-specific context data may include evaluating user profile information, such as areas of interest, contact information, social media postings, and the like. The method 500B ends with the end operation 544.

As should be appreciated, operations 530-544 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6 is a block diagram illustrating physical components (e.g., hardware) of a computing device 600 with which aspects of the disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 includes notetaking mode selector 630, pixel region receiver 632, context determiner 634, context data retriever 636, notes data retriever 638, and notetaking app 640 as described in more details in FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client utilized by a user (e.g., the system 100 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included as an optional input element, a side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server (e.g., the notetaking server 108 and the web server 116, as shown in FIG. 1), a mobile computing device, etc. That is, the mobile computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 868 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for interactive notetaking according to at least the examples provided in the sections below. The method comprises receiving, in a notetaking mode, a selection of one or more regions displayed on a computer screen, wherein the one or more selected regions include content; displaying an indication of the selection over the content of the one or more selected regions; evaluating data associated with the content on the computer screen to detect as least one of text data or image data associated with the content; evaluating at least one of a user profile, a user browsing history, the one or more selected regions, or the computer display to determine context data associated with the content; automatically generating notes data based on a combination of the detected text data or image data associated with the content and the determined context data associated with the content; and displaying the notes data to a user for recall of the content based on the context data. The interactive input selecting the notetaking mode includes an input event associated with a handheld input device. The method further comprises deactivating the notetaking mode in response to a second interactive input selecting the notetaking mode. The text data is detected from the pixel data using image recognition. The method further comprises determining the context data associated with the content using a machine learning model, wherein the machine learning model, when trained, predicts the context data based on the content. The user context includes information about one or more web pages visited by the user that are contextually similar to the content based on a browsing history. The display context includes at least one of: a window title, a location information of a web page, a document name, a meeting name, or meeting attendees.

Another aspect of the technology relates to a system for interactive notetaking. The system comprises a processor configured to execute a method comprising receiving, in a notetaking mode, a selection of one or more regions displayed on a computer screen, wherein the one or more selected regions include content; displaying an indication of the selection over the content of the one or more selected regions; evaluating data associated with the content on the computer screen to detect as least one of text data or image data associated with the content; evaluating at least one of a user profile, a user browsing history, the one or more selected regions, or the computer display to determine context data associated with the content; automatically generating notes data based on a combination of the detected text data or image data associated with the content and the determined context data associated with the content; and displaying the notes data to a user for recall of the content based on the context data. The selection of the one or more regions is received via a virtual pen associated with the notetaking mode. The selection of the one or more regions is received via an input device. The indication is one of highlighting or outlining the content. The evaluated data is pixel data. The context data is associated with display context of the content, and wherein the display context includes attributes of at least one of a window, an application, a browser, an image, or a document associated with the content within the one or more selected regions. The notes data is displayed at a later time to the user. The notes data is displayed in response to receiving a selection of a notetaking application storing the notes data.

In still further aspects, the technology relates to a device for interactive notetaking. The device comprises a processor configured to execute a method comprising receiving, in a notetaking mode, a selection of one or more regions displayed on a computer screen from a handheld input device, wherein the one or more selected regions include content; displaying an indication of the selection over the content of the one or more selected regions; evaluating data associated with the content on the computer screen to detect as least one of text data or image data associated with the content; evaluating at least one of a user profile, a user browsing history, the one or more selected regions, or the computer display to determine context data associated with the content; automatically generating notes data based on a combination of the detected text data or image data associated with the content and the determined context data associated with the content; and displaying the notes data to a user for recall of the content based on the context data. The election of one or more regions includes a plurality of windows. The displaying the notes data includes a list of notes data sorted in a reverse chronological order. The context data is associated with display context of the content, and wherein the display context includes attributes of at least one of a window, an application, a browser, an image, or a document associated with the content within the one or more selected regions. The notes data is displayed at a later time to the user.

Any of the one or more above aspects in combination with any other of the one or more aspect. Any of the one or more aspects as described herein.

What is claimed is:

1. A computer-implemented method for interactive notetaking, comprising:
   receiving, in a notetaking mode of a display screen, a selection of one or more regions displayed on the display screen, wherein the one or more selected regions include pixel data of content, and the pixel data include a copy of raster image data in pixels of the selection of one or more regions displayed on the display screen for object recognition of the content;
   displaying an indication of the selection over the content of the one or more selected regions;
   evaluating the pixel data of the content displayed on the display screen using the object recognition to detect at least one of text data or image data associated with the content;

evaluating at least one of a user profile, a user browsing history, the one or more selected regions, or the display screen to determine context data of the content;

automatically generating notes data comprising both the detected text data or image data associated with the content and the determined context data of the content; and displaying the notes data to a user for recall of the content based on the context data.

2. The computer-implemented method of claim 1, wherein the receiving of the selection in the notetaking mode includes an input event associated with a handheld input device.

3. The computer-implemented method of claim 1, further comprising:
deactivating the notetaking mode in response to a second interactive input selecting the notetaking mode.

4. The computer-implemented method of claim 1, wherein the text data is detected from the pixel data using image recognition.

5. The computer-implemented method of claim 1, further comprising:
determining the context data associated with the content using a machine learning model, wherein the machine learning model, when trained, predicts the context data based on the content.

6. The computer-implemented method of claim 1, wherein
the context data include information about one or more web pages visited by the user that are contextually similar to the content based on a browsing history.

7. The computer-implemented method of claim 1, wherein
the context data include at least one of:
a window title,
a location information of a web page,
a document name,
a meeting name, or
meeting attendees.

8. A system for interactive notetaking, the system comprises a processor configured to execute a method comprising:
receiving, in a notetaking mode of a display screen, a selection of one or more regions displayed on the display screen, wherein the one or more selected regions include pixel data of content, and the pixel data include a copy of raster image data in pixels of the selection of one or more regions displayed on the display screen for object recognition of the content;
displaying an indication of the selection over the content of the one or more selected regions;
evaluating the pixel data of the content displayed on the display screen using the object recognition to detect at least one of text data or image data associated with the content;
evaluating at least one of a user profile, a user browsing history, the one or more selected regions, or the display screen to determine context data of the content;
automatically generating notes data comprising both the detected text data or image data associated with the content and the determined context data of the content; and
displaying the notes data to a user for recall of the content based on the context data.

9. The system of claim 8, wherein the selection of the one or more regions is received via a virtual pen associated with the notetaking mode.

10. The system of claim 9, wherein the indication is one of highlighting or outlining the content.

11. The system of claim 8, wherein the selection of the one or more regions is received via an input device.

12. The system of claim 8, wherein the evaluated pixel data includes pixel data include a highlighted text character.

13. The system of claim 8, wherein the context data is associated with display context of the content, and wherein the display context includes attributes of at least one of a window, an application, a browser, an image, or a document associated with the content within the one or more selected regions.

14. The system of claim 8, wherein the notes data is displayed at a later time to the user.

15. The system of claim 8, wherein the notes data is displayed in response to receiving a selection of a notetaking application storing the notes data.

16. A device for interactive notetaking, the device comprises a processor configured to execute a method comprising:
receiving, in a notetaking mode of a display screen, a selection of one or more regions displayed on the display screen from a handheld input device, wherein the one or more selected regions include pixel data of content, and the pixel data include a copy of raster image data in pixels of the selection of one or more regions displayed on the display screen for object recognition of the content;
displaying an indication of the selection over the content of the one or more selected regions;
evaluating the pixel data of the content displayed on the display screen using the object recognition to detect at least one of text data or image data associated with the content;
evaluating at least one of a user profile, a user browsing history, the one or more selected regions, or the display screen to determine context data of the content;
automatically generating notes data comprising both the detected text data or image data associated with the content and the determined context data of the content; and
displaying the notes data to a user for recall of the content based on the context data.

17. The device of claim 16, wherein the selection of one or more regions includes a plurality of windows.

18. The device of claim 16, wherein the displaying the notes data includes a list of notes data sorted in a reverse chronological order.

19. The device of claim 16, wherein the context data is associated with display context of the content, and wherein the display context includes attributes of at least one of a window, an application, a browser, an image, or a document associated with the content within the one or more selected regions.

20. The device of claim 16, wherein the notes data is displayed at a later time to the user.

* * * * *